(12) United States Patent
Tao et al.

(10) Patent No.: US 8,698,512 B2
(45) Date of Patent: Apr. 15, 2014

(54) CAPACITANCE SENSOR LAYOUT SCHEME FOR LINEARITY IMPROVEMENT

(75) Inventors: Yi-Hsin Tao, Hsinchu (TW); Chia-Hsing Lin, Hsinchu (TW); Wen-Jun Hsu, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 171 days.

(21) Appl. No.: 13/186,580

(22) Filed: Jul. 20, 2011

(65) Prior Publication Data

US 2012/0019268 A1 Jan. 26, 2012

(30) Foreign Application Priority Data

Jul. 26, 2010 (TW) ................................ 99124523 A

(51) Int. Cl.
*G01R 27/26* (2006.01)
(52) U.S. Cl.
USPC ........................................................ 324/686
(58) Field of Classification Search
USPC .................... 324/658–690; 178/18.06, 19.03; 341/33; 345/173, 174
See application file for complete search history.

(56) References Cited

U.S. PATENT DOCUMENTS

| | | | |
|---|---|---|---|
| 2007/0046648 A1 | 3/2007 | Lee et al. | |
| 2008/0218487 A1 | 9/2008 | Huang et al. | |
| 2009/0273572 A1 | 11/2009 | Edwards et al. | |
| 2010/0045614 A1 | 2/2010 | Gray et al. | |
| 2010/0079384 A1 | 4/2010 | Grivna | |
| 2010/0110039 A1 | 5/2010 | Li | |
| 2010/0302201 A1* | 12/2010 | Ritter et al. | 345/174 |
| 2011/0102361 A1* | 5/2011 | Philipp | 345/174 |

FOREIGN PATENT DOCUMENTS

| | | |
|---|---|---|
| CN | 101187846 A | 5/2008 |
| TW | 200837620 A | 9/2008 |
| TW | M355395 U1 | 4/2009 |
| TW | 200944877 A1 | 11/2009 |
| TW | 201009670 A1 | 3/2010 |
| TW | 201019200 A | 5/2010 |

OTHER PUBLICATIONS

Communication from the Taiwan Patent Office regarding a counterpart foreign application dated Taiwan Year 102 Apr. 26, 2013.
Communication from Taiwan Patent Office Regarding a Counter-Part Foreign Application Dated (102 Taiwan Year) Oct. 18, 2013.

* cited by examiner

*Primary Examiner* — Melissa Koval
*Assistant Examiner* — Daniel Miller
(74) *Attorney, Agent, or Firm* — Rosenberg, Klein & Lee

(57) ABSTRACT

A capacitive touchpad includes a plurality of parallel traces configured in a capacitance sensor layout scheme such that the maximum sensor gap is smaller than the sensor pitch to improve the sensor response linearity of the capacitive touchpad.

2 Claims, 6 Drawing Sheets

CAPACITANCE SENSOR LAYOUT SCHEME FOR LINEARITY IMPROVEMENT

FIELD OF THE INVENTION

The present invention is related generally to a capacitive touchpad and, more particularly, to a capacitance sensor layout scheme for a capacitive touchpad.

BACKGROUND OF THE INVENTION

As shown in FIG. 1, a conventional two-dimensional capacitive touchpad uses a plurality of capacitance sensors X1, X2 and X3 in X-direction and a plurality of capacitance sensors Y1, Y2 and Y3 in Y-direction for touch detection, of which each capacitance sensor is constructed from a trace, with the layout of diamond shape to maximize the per trace area for both X-direction and Y-direction. This capacitance sensor layout has the X-directional sensor pitch PX, the Y-directional sensor pitch PY, the maximum X-directional sensor gap MXgap and the maximum Y-directional sensor gap MYgap, as designated in FIG. 1, and the maximum sensor gaps MXgap and MYgap are equal to the sensor pitches PX and PY, respectively. The capacitive touchpad identifies a touch of a conducting object by detecting the capacitance changes on the capacitance sensors X1-X3 and Y1-Y3, and the magnitude of a capacitance change depends on the area of the object projected on the capacitance sensors. If the maximum sensor gap is large, the detectable object location resolution will be low due to nonlinear response of the object induced capacitance change on different traces, and thus the calculated location will be trapped to the nearest trace center, resulting in poor linearity. For example, as shown in FIG. 1, when an object is at the location 10, although it touches the X-directional traces X2 and X3 and the Y-directional traces Y1 and Y2 simultaneously, the areas where it touches the capacitance sensors X2 and Y2 are larger than that of the others X3 and Y1, so the capacitance changes on the capacitance sensors X2 and Y2 are more significant than that of the others X3 and Y1, and as a result the calculated location of the object will be closer to the coordinates (X2,Y2). When the object moves along X-direction from the location 10 to another 12, even though the real Y-directional location of the object does not change, the Y-directional capacitance changes will jump violently, causing the calculated Y coordinate varying significantly and thereby a larger nonlinear response existing. Thus, the capacitive touchpad will have a lower locating accuracy.

Therefore, it is desired a capacitance sensor layout scheme for linearity improvement.

SUMMARY OF THE INVENTION

An objective of the present invention is to provide a capacitance sensor layout scheme for a capacitive touchpad.

Another objective of the present invention is to provide a linearity improved capacitive touchpad.

According to the present invention, a capacitance sensor layout scheme for a capacitive touchpad includes a plurality of parallel traces, of which each trace is a capacitance sensor or at least two adjacent traces form a capacitance sensor, and the distance between the centers of two adjacent capacitance sensors is larger than the maximum sensor gap between two adjacent traces. Since the maximum sensor gap between two adjacent traces is smaller than the distance between the centers of two adjacent capacitance sensors, the capacitive touchpad will have improved sensor response linearity.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
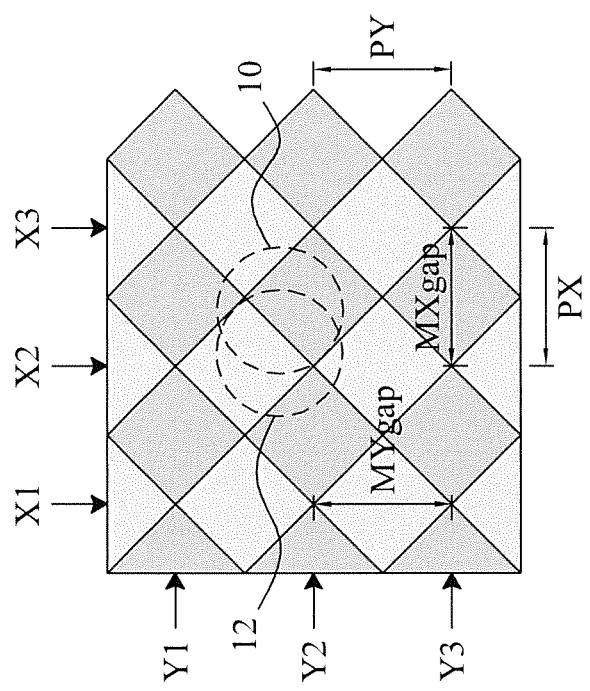
FIG. 1 is a perspective diagram showing the capacitance sensor layout scheme of a conventional two-dimensional capacitive touchpad.
Figure 2:
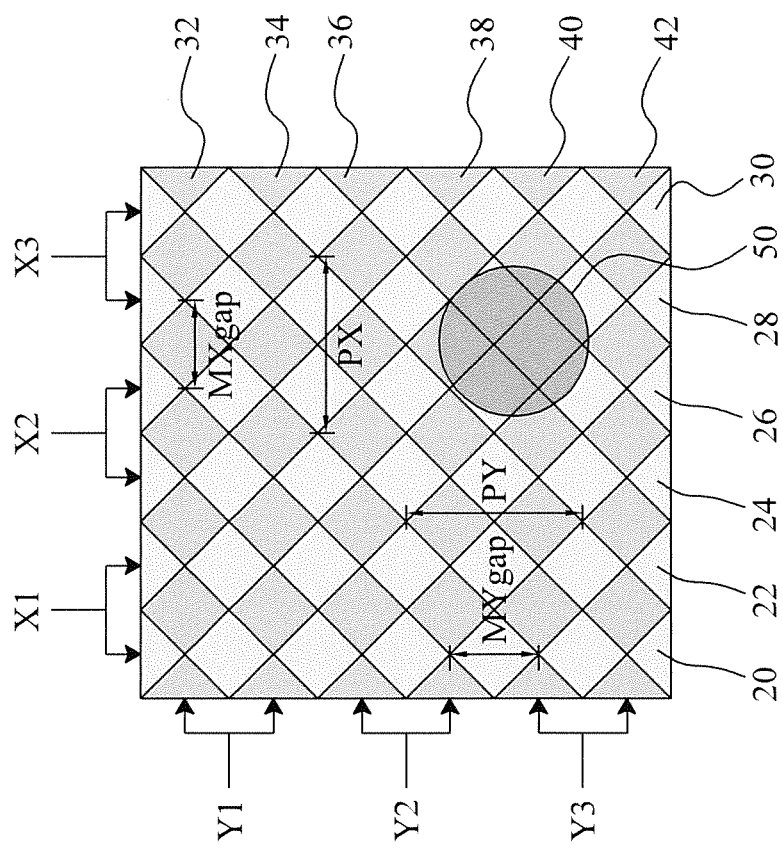
FIG. 2 is a perspective diagram of a first capacitance sensor layout scheme according to the present invention.

To improve the sensor response linearity of a capacitive touchpad, the maximum gap of the capacitance sensor layout is reduced. FIG. 2 is a perspective diagram showing a first embodiment according to the present invention, which is implemented by splitting the large diamond shape sensor into two parallel connected small diamond shape sensor. For a capacitive touchpad including a plurality of parallel X-directional traces 20, 22, 24, 26, 28 and 30 and a plurality of parallel Y-directional traces 32, 34, 36, 38, 40 and 42, the X-directional traces 20 and 22 are electrically connected to each other to form an X-directional capacitance sensor X1, the X-directional traces 24 and 26 are electrically connected to each other to form an X-directional capacitance sensor X2, the X-directional traces 28 and 30 are electrically connected to each other to form an X-directional capacitance sensor X3, the Y-directional traces 32 and 34 are electrically connected to each other to form a Y-directional capacitance sensor Y1, the Y-directional traces 36 and 38 are electrically connected to each other to form a Y-directional capacitance sensor Y2, and the Y-directional traces 40 and 42 are electrically connected to each other to form a Y-directional capacitance sensor Y3. The electrical connections of each two adjacent X-directional traces and each two adjacent Y-directional traces which form the X-directional capacitance sensors and the Y-directional capacitance sensors can be arranged either inside or outside the capacitive touchpad. In this capacitance sensor layout, the distance between the centers of two adjacent X-directional capacitance sensors is the X-directional sensor pitch PX, the distance between the centers of two adjacent Y-directional capacitance sensors is the Y-directional sensor pitch PX, the distance between two adjacent X-directional traces is the maximum X-directional sensor gap which is denoted as MXgap, and the distance between two adjacent Y-directional traces is the maximum Y-directional sensor gap which is denoted as MYgap. Therefore, MXgap=0.5PX and MYgap=0.5PY. As shown in FIG. 2, when an object touches the capacitive touchpad at the location 50, the capacitive touchpad will detect the capacitance changes on the X-directional capacitance sensors X2 and X3 and the Y-directional capacitance sensors Y2 and Y3, and with the detected capacitance change the location of the object can be calculated accurately. Further, since the maximum sensor gaps MXgap and MYgap are smaller than the sensor pitches PX and PY, respectively, the capacitance changes will remain more stable when the object moves along X-direction or Y-direction from its initial location 50. Consequently, the capacitive touchpad will have improved sensor response in linearity. In other embodiments, it may reduce only one of the X-directional and Y-directional maximum sensor gaps by splitting the large diamond shape sensor in the corresponding direction into two or more parallel connected small diamond shape sensor, in order to improve the sensor response linearity of the capacitive touchpad along that direction.

Figure 3:
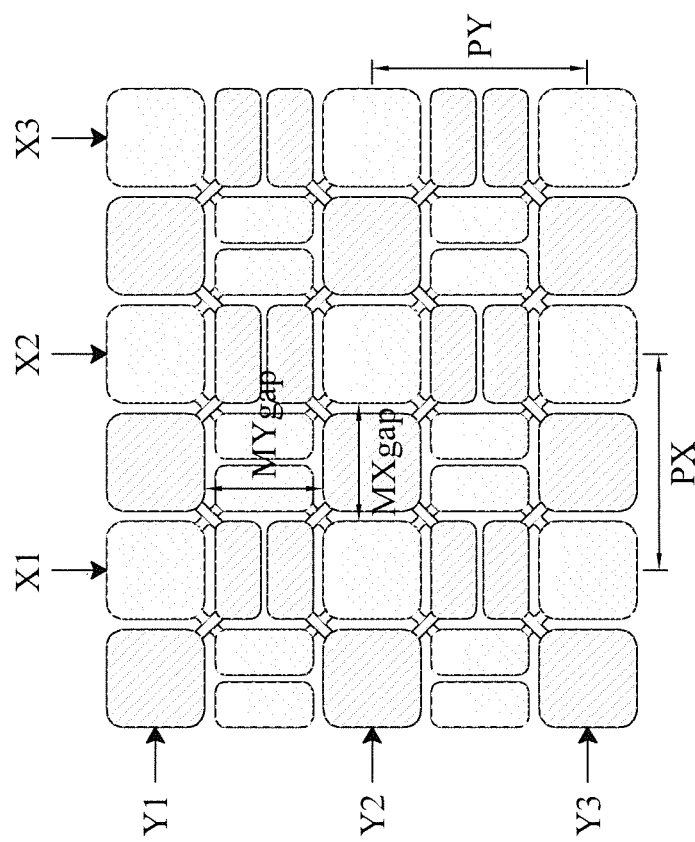
FIG. 3 is a perspective diagram of a second capacitance sensor layout scheme according to the present invention.
Figure 4:
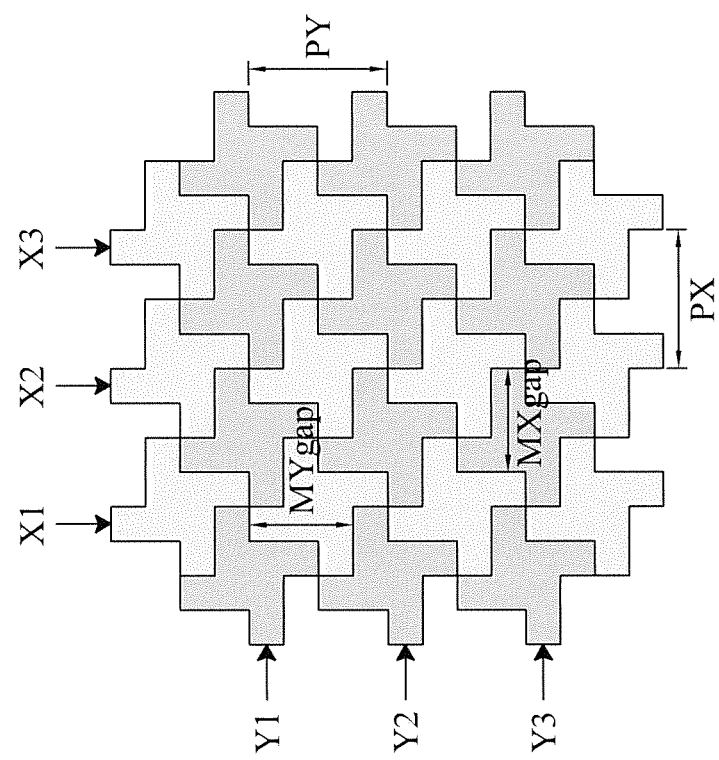
FIG. 4 is a perspective diagram of a third capacitance sensor layout scheme according to the present invention.
Figure 5:
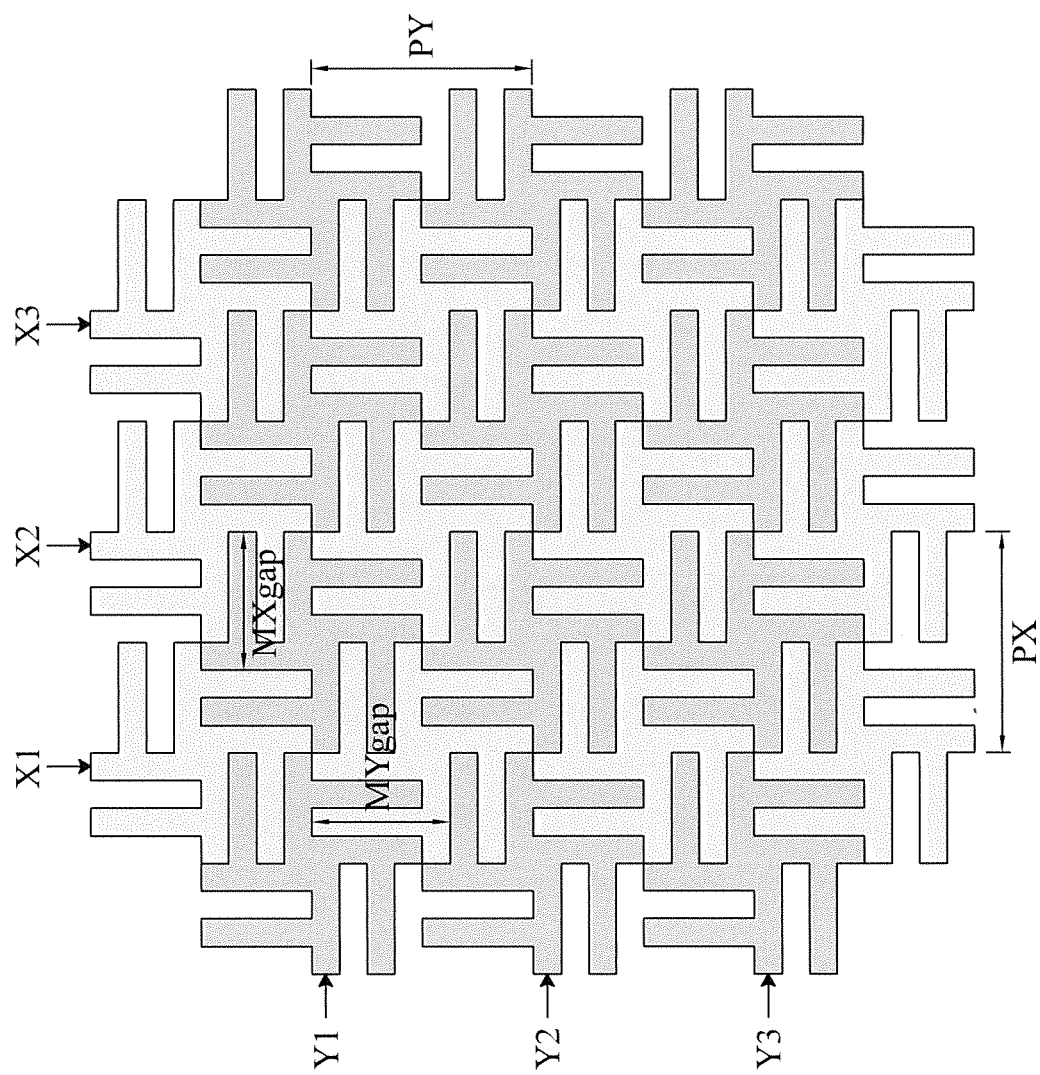
FIG. 5 is a perspective diagram of a fourth capacitance sensor layout scheme according to the present invention.
Figure 6:
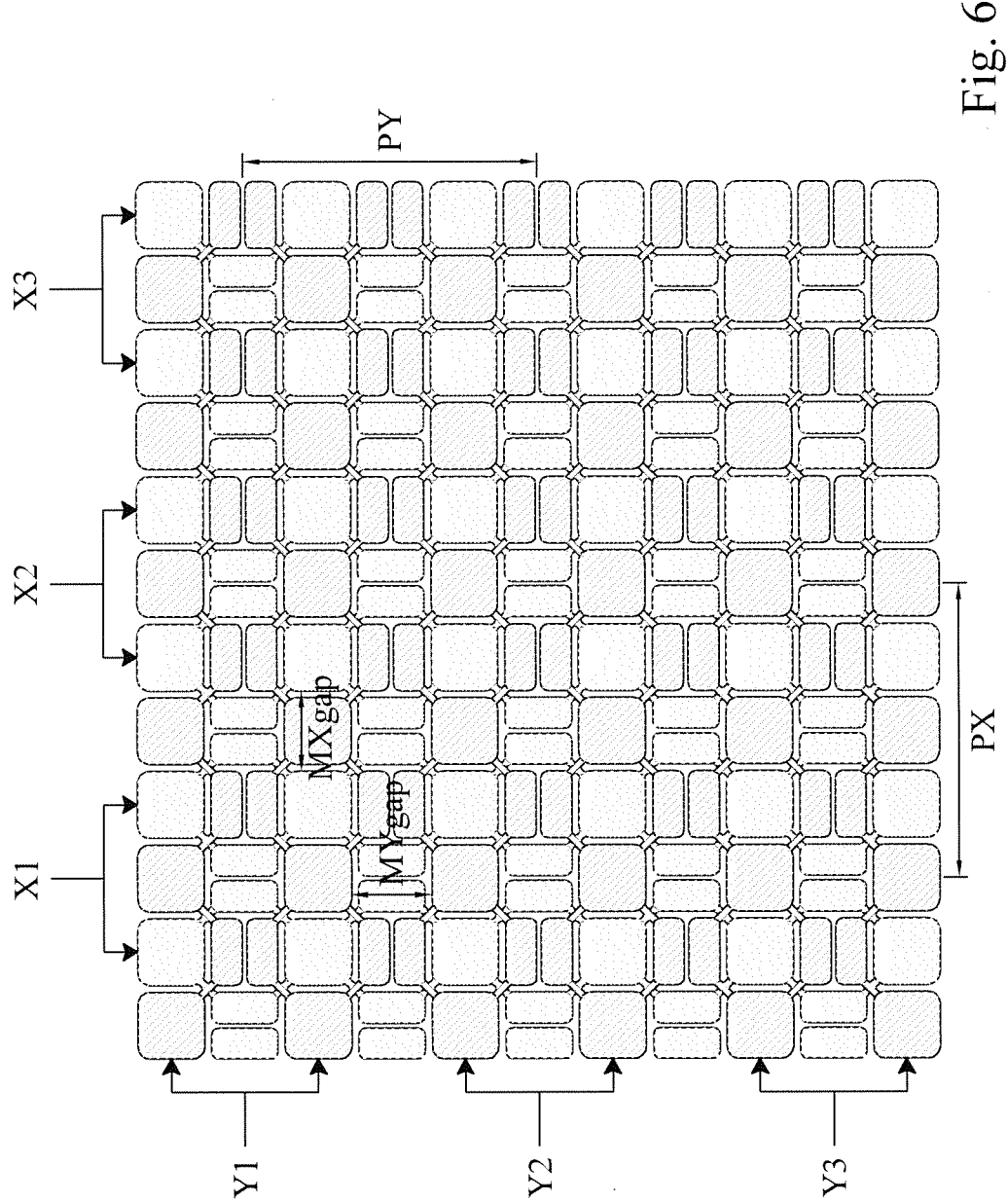
FIG. 6 is a perspective diagram of a fifth capacitance sensor layout scheme according to the present invention.

FIG. 3 is a perspective diagram showing a second embodiment according to the present invention, which is implemented by reducing the maximum sensor gaps with given sensor pitches PX and PY. This capacitance sensor layout includes X-directional capacitance sensors X1, X2 and X3 and Y-directional capacitance sensors Y1, Y2 and Y3, each of which is established by only a trace, yet has a plurality of square and rectangular grains such arranged that MXgap=0.5PX and MYgap=0.5PY. The electrode may have irregular shape, for example, as shown in FIGS. 4 and 5. The capacitive touchpad of FIG. 3 may, similar to that of FIG. 2, have each two adjacent traces electrically connected to each other to form a capacitance sensor, as shown by the capacitance sensors X1, X2, X3, Y1, Y2 and Y3 of FIG. 6, and by doing so, MXgap=0.25PX and MYgap=0.25PY.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touchpad comprising:
multiple sensing columns each respectively having multiple first electrodes and multiple second electrodes alternately connected in series in a first direction, each two adjacent first electrodes connected by each two second electrodes that are separated from each other;
multiple sensing rows each respectively having multiple third electrodes and multiple fourth electrodes alternately connected in series in a second direction, each two adjacent third electrodes connected by each two fourth electrodes that are separated from each other, wherein
each two fourth electrodes in each two adjacent sensing rows are provided between each two adjacent first electrodes of the same sensing column;
each two second electrodes in each two adjacent sensing columns are provided between each two adjacent third electrodes of each two adjacent sensing rows;
a first maximum interval is defined between each two adjacent sensing columns, a first distance is defined between centers of each two adjacent sensing columns, and the first maximum interval is shorter than the first distance; and
a second maximum interval is defined between each two adjacent sensing rows, a second distance is defined between centers of each two adjacent sensing rows, and the second maximum interval is shorter than the second distance.

2. The capacitive touchpad as claimed in claim 1, wherein the first maximum interval is half of the first distance; and the second maximum interval is half of the second distance.

* * * * *